US008901455B2

(12) United States Patent
Schaeffer et al.

(10) Patent No.: US 8,901,455 B2
(45) Date of Patent: Dec. 2, 2014

(54) WELDING WIRE FOR SUBMERGED ARC WELDING (75) Inventors: J. Ben Schaeffer, Lakewood, OH (US); Boris Kahn, Beachwood, OH (US)

(73) Assignee: Lincoln Global, Inc., City of Industry, CA (US)

( * ) Notice: Subject to any disclaimer, the term of this patent is extended or adjusted under 35 U.S.C. 154(b) by 1508 days.

(21) Appl. No.: 12/141,654

(22) Filed: Jun. 18, 2008

(65) Prior Publication Data

US 2009/0314756 A1 Dec. 24, 2009

(51) Int. Cl.
*B23K 35/02* (2006.01)
*B23K 35/36* (2006.01)
*B23K 9/18* (2006.01)

(52) U.S. Cl.
CPC ............. *B23K 9/186* (2013.01); *B23K 2201/32* (2013.01); *B23K 35/36* (2013.01); *B23K 35/0211* (2013.01)
USPC .................................................. 219/145.22

(58) Field of Classification Search
USPC ............... 219/145.22, 145.31, 146.31, 146.1, 219/137 R, 136; 428/624, 340, 385
See application file for complete search history.

(56) References Cited

U.S. PATENT DOCUMENTS

| 3,620,830 | A | * | 11/1971 | Arthur Kramer | ........ 219/145.23 |
| 3,767,888 | A | | 10/1973 | Sullivan | |
| 3,783,234 | A | | 1/1974 | Russell | |
| 4,197,362 | A | | 4/1980 | Schmidberger et al. | |
| 4,213,025 | A | | 7/1980 | Kuhnen | |
| 4,913,927 | A | | 4/1990 | Anderson | |
| 5,223,478 | A | | 6/1993 | Whitlow et al. | |
| 5,378,875 | A | | 1/1995 | Hirama et al. | |
| 5,426,094 | A | | 6/1995 | Hull et al. | |
| 5,550,348 | A | | 8/1996 | Masaie et al. | |
| 5,554,308 | A | | 9/1996 | Masaie et al. | |
| 5,672,287 | A | * | 9/1997 | Masaie et al. | ............ 219/145.22 |
| 5,686,198 | A | | 11/1997 | Kuo et al. | |
| 5,935,911 | A | | 8/1999 | Yamada et al. | |
| 5,981,444 | A | | 11/1999 | Sawada et al. | |
| 6,337,144 | B1 | | 1/2002 | Shimzu et al. | |
| 6,346,566 | B1 | | 2/2002 | Yabe et al. | |
| 6,669,926 | B1 | | 12/2003 | Achilefu et al. | |
| 6,696,170 | B2 | | 2/2004 | Kim et al. | |
| 2003/0015511 | A1 | | 1/2003 | Kim et al. | |

(Continued)

FOREIGN PATENT DOCUMENTS

EP 1733838 12/2006
GB 502823 3/1939

(Continued)

OTHER PUBLICATIONS

Buhiyan, "Topical Review, Solution-derived Textured Oxide Thin Films—A Review", Superconductivity Science Technology, vol. 19, Institute of PHysics Publishing, Jan. 4, 2006.

(Continued)

*Primary Examiner* — Brian Jennison
(74) *Attorney, Agent, or Firm* — Calfee, Halter & Griswold, LLP (57) ABSTRACT The copper cladding normally applied to the surfaces of a submerged arc welding wire for preventing weld gun contact tip abrasive wear is replaced with a solid lubricant. This eliminates copper contamination of the weld from the copper cladding while preserving the useful life of the contact tip.

22 Claims, 4 Drawing Sheets

(56) References Cited

U.S. PATENT DOCUMENTS

| | | | |
|---|---|---|---|
| 2005/0044687 A1 | 3/2005 | Matsuguchi et al. | |
| 2005/0045699 A1* | 3/2005 | Konishi et al. | 228/214 |
| 2006/0255027 A1 | 11/2006 | Katiyar | |
| 2006/0261054 A1 | 11/2006 | Katiyar | |
| 2006/0278627 A1* | 12/2006 | Burt et al. | 219/145.23 |
| 2007/0158768 A1 | 7/2007 | Pilchowski et al. | |
| 2007/0184324 A1 | 8/2007 | Lyons et al. | |

FOREIGN PATENT DOCUMENTS

| | | |
|---|---|---|
| GB | 1538973 | 1/1979 |
| JP | 54-081138 | 6/1979 |
| JP | 55-128395 | 10/1980 |
| JP | 02-098595 | 3/1990 |
| JP | 04-300095 | 10/1992 |
| JP | 05-023731 | 2/1993 |
| JP | 05-171463 | 7/1993 |
| JP | 05-287293 | 11/1993 |
| JP | 05-329683 | 12/1993 |
| JP | 06-106129 | 4/1994 |
| JP | 06-262389 | 9/1994 |
| JP | 06-277877 | 10/1994 |
| JP | 06-277880 | 10/1994 |
| JP | 06-285677 | 10/1994 |
| JP | 06-285678 | 10/1994 |
| JP | 06-306385 | 11/1994 |
| JP | 07-032186 | 2/1995 |
| JP | 07-097583 | 4/1995 |
| JP | 07-136796 | 5/1995 |
| JP | 07-136797 | 5/1995 |
| JP | 07-241694 | 9/1995 |
| JP | 07-251295 | 10/1995 |
| JP | 07-276089 | 10/1995 |
| JP | 08-019893 | 1/1996 |
| JP | 08-057650 | 3/1996 |
| JP | 08-099188 | 4/1996 |
| JP | 08-150494 | 6/1996 |
| JP | 08-151548 | 6/1996 |
| JP | 08-155671 | 6/1996 |
| JP | 08-155674 | 6/1996 |
| JP | 08-157858 | 6/1996 |
| JP | 08-192292 | 7/1996 |
| JP | 08-197278 | 8/1996 |
| JP | 08-206879 | 8/1996 |
| JP | 08-229697 | 9/1996 |
| JP | 08-243779 | 9/1996 |
| JP | 08-252691 | 10/1996 |
| JP | 08-257788 | 10/1996 |
| JP | 08-267284 | 10/1996 |
| JP | 08-281471 | 10/1996 |
| JP | 08-281480 | 10/1996 |
| JP | 08-290287 | 11/1996 |
| JP | 09-001391 | 1/1997 |
| JP | 09-059667 | 3/1997 |
| JP | 09-070684 | 3/1997 |
| JP | 09-070685 | 3/1997 |
| JP | 09-070691 | 3/1997 |
| JP | 09-071792 | 3/1997 |
| JP | 09-076089 | 3/1997 |
| JP | 09-122974 | 5/1997 |
| JP | 09-141489 | 6/1997 |
| JP | 09-141491 | 6/1997 |
| JP | 09-150292 | 6/1997 |
| JP | 09-206987 | 8/1997 |
| JP | 09-302374 | 11/1997 |
| JP | 09-323191 | 12/1997 |
| JP | 10-058183 | 3/1998 |
| JP | 10-146693 | 6/1998 |
| JP | 10-193175 | 7/1998 |
| JP | 11-005192 | 1/1999 |
| JP | 11-077373 | 3/1999 |
| JP | 11-104883 | 4/1999 |
| JP | 11-104887 | 4/1999 |
| JP | 11-147174 | 6/1999 |
| JP | 11-147194 | 6/1999 |
| JP | 11-147195 | 6/1999 |
| JP | 11-170082 | 6/1999 |
| JP | 11-197878 | 7/1999 |
| JP | 11-217578 | 8/1999 |
| JP | 11-254182 | 8/1999 |
| JP | 11-335685 | 12/1999 |
| JP | 2000-087058 | 3/2000 |
| JP | 2000-094178 | 4/2000 |
| JP | 2000-117486 | 4/2000 |
| JP | 2000-141080 | 5/2000 |
| JP | 2000-158185 | 6/2000 |
| JP | 2000-237894 | 9/2000 |
| JP | 2000-317679 | 11/2000 |
| JP | 2001-113390 | 4/2001 |
| JP | 2001-179481 | 7/2001 |
| JP | 2001-239393 | 9/2001 |
| JP | 2001-252786 | 9/2001 |
| JP | 2002-219595 | 8/2002 |
| JP | 2002-226880 | 8/2002 |
| JP | 2002-239779 | 8/2002 |
| JP | 2002-283096 | 10/2002 |
| JP | 2002-346787 | 12/2002 |
| JP | 2003-039191 | 2/2003 |
| JP | 2003-170293 | 6/2003 |
| JP | 2003-191092 | 7/2003 |
| JP | 2003-225794 | 8/2003 |
| JP | 2003-236694 | 8/2003 |
| JP | 2003-275893 | 9/2003 |
| JP | 2003-275894 | 9/2003 |
| JP | 2003-305587 | 10/2003 |
| JP | 2003-311475 | 11/2003 |
| JP | 2003320481 | 11/2003 |
| JP | 2004-001061 | 1/2004 |
| JP | 2004-025200 | 1/2004 |
| JP | 2004-034131 | 2/2004 |
| JP | 2004-058142 | 2/2004 |
| JP | 2004-098157 | 4/2004 |
| JP | 2004-141908 | 5/2004 |
| JP | 2004-195543 | 7/2004 |
| JP | 2004-202572 | 7/2004 |
| JP | 2004-237299 | 8/2004 |
| JP | 2004-314099 | 11/2004 |
| JP | 2005-074438 | 3/2005 |
| JP | 2005-074490 | 3/2005 |
| JP | 2005-095972 | 4/2005 |
| JP | 2005-205493 | 4/2005 |
| JP | 2005-246419 | 9/2005 |
| JP | 2006-095551 | 4/2006 |
| JP | 2006-095552 | 4/2006 |
| JP | 2006-095579 | 4/2006 |
| JP | 2006-102793 | 4/2006 |
| JP | 2006-102794 | 4/2006 |
| JP | 2006-102799 | 4/2006 |
| JP | 2006-102800 | 4/2006 |
| JP | 2006-175451 | 7/2006 |
| JP | 2006-175452 | 7/2006 |
| JP | 2006-224172 | 8/2006 |
| SU | 582932 | 12/1977 |

OTHER PUBLICATIONS

Perovskite—7 pgs. from http://wikis.lib.ncsu.edu/index.php/Perovskite, printed Oct. 5, 2007.

McEvoy, "Materials for high-temperature oxygen reduction in solid oxide fuel cells", J. of Materials Science, 36, pp. 1087-1091, 2001.

Melfi et al., "Causes and Prevention of Copper Cracking in Saw Pipe Seam Welds", copyright 2004, Rio Pipeline 2005 Conference & Exposition, pp. 1-5.

Pena et al., "Chemical Structures and Performance of Perovskite Oxides", Chem. Rev. 101 (7), 75 pgs, 2001.

Shimzu et al., "Wear Mechanism in Contact Tube", Science and Technology of Welding and Joining, vol. 11, No. 1, 2006, pp. 94-105.

Zahid et al., Electrical conductivity of perovskites in the quasi-ternary system $La[0.8]Sr[0.2]MnO[3]$-$La[0.8]Sr[0.2]CoO[3]$-$La[0.8]Sr[0.2]FeO[3]$ for application as cathode-interconnect contact layer in SOFC Proceedings—Electrochemical Society, vol. 7 (2), pp. 1708-1716.

(56) References Cited

OTHER PUBLICATIONS

Walck et al., "Characterization of air-annealed, pulsed laser deposited ZnO-WS2 solid film lubricants by transmission electron microscopy", Thin Solid Films, 305, pp. 130-143, 1997.
ExxonMobil Material Safety Data Sheet, Product Name: Mobil Velocite Oil No. 10, revision Date Nov. 1, 2006, 8 pgs.
Lubrizol Material Safety Data Sheet, 5979A, Code A678, 6 pgs. Mar. 2, 2005.
Lubrizol Metalworking Additives, one page, http://www.lubrizol.com/products/metalworking/default.asp, printed Jan. 22, 2008.
Mobil Velocite Oil Numbered Series, Spindle and Hydraulic Oils, two pages, printed Jan. 22, 2008, http://www.mobile.com/USA-English/Lubes/PDS/GLXXENINDMOMobil_Velocite_Oil_...
Sasol North America, Material Safety Data Sheet, 154L Specialty Alkylate, A714, printed Jan. 11, 2005, 7 pgs., version 1.5.
Sasol North America, Technical Data Sheet, V-154L Specialty Alkylate, 7 pgs., version 1.5, printed Jan. 11, 2005.
Sasol North America, Material Safety Data Sheet, 9050 Specialty Alkylate, printed Jan. 11, 2005, 7 pgs, version 1.4.
Sasol North America, Technical Data Sheet, V-3060L-B Specialty Alkylate, 7 pgs., version 1.3, printed Jan. 11, 2005.
Tejuca, et al., Marcel Dekker, Inc., NY, 1993, "Properties and Applications of Perovskite-Type Oxides", Chapter 1, pp. 1-23 by J. Twu et al., "Preparation of Bulk and Supported Perovskites", Chapter 3, by D.M. Smyth, pp. 47-72, "Oxidative Nonstoichiometry in Perovskite Oxides", and Chapter 9, pp. 195-214, by J.L.G. Fierro, "Composition and Structure of Perovskite Surfaces".
Perovskite—one page from Wikipedia, printed Oct. 5, 2007, http://en.wikipedia.org/wiki/Perovskite.
Office action from U.S. Appl. No. 12/141,621 dated Oct. 29, 2010.
Response from U.S. Appl. No. 12/141,621 dated Aug. 6, 2010.
Request for Reconsideration from U.S. Appl. No. 12/141,621 dated Jan. 31, 2011.
Advisory Action from U.S. Appl. No. 12/141,621 dated Feb. 24, 2011.
Amendment from U.S. Appl. No. 12/141,621 dated Apr. 28, 2011.
Office action from U.S. Appl. No. 12/141,621 dated Nov. 30, 2011.
Sasol North America, Technical Data Sheet, V-159L Specialty Aklylate, 7 pgs. version 1.4 dated Jan. 11, 2005.
Office action from U.S. Appl. No. 12/141,621 dated Jul. 26, 2010.
International Search Report and Written Opinion from PCT/IB09/005860 dated Aug. 20, 2009.
International Search Report from PCT/IB09/005865 dated Sep. 21, 2009.
Written Opinion from PCT/IB09/005865 dated Sep. 21, 2009.
Office action from U.S. Appl. No. 12/141,621 dated Jul. 24, 2012.
Office action from European Application No. 09766180.5 dated Apr. 28, 2012.
Interview Summary from U.S. Appl. No. 12/141,621 dated Nov. 19, 2012.
Amendment from U.S. Appl. No. 12/141,621 dated Dec. 21, 2012.
Telephone Interview Summary from U.S. Appl. No. 12/141,621 dated Jan. 24, 2013.
Interview Summary from U.S. Appl. No. 12/141,621 dated Jan. 29, 2013.
Office action from U.S. Appl. No. 12/141,621 dated Dec. 17, 2013.
Amendment from U.S. Appl. No. 12/141,621 dated Apr. 29, 2014.
Notice of Allowance from U.S. Appl. No. 12/141,621 dated Jun. 12, 2014.
Fierro, "Composition and Structure of Perovskite Surfaces", Chapter 9, pp. 195-214 (1993), from Properties and Applications of Perovskite-type Oxides.
Kamimura, "Theory of Copper Oxide Superconductors", 2005, Springer Verlag, Berlin, 10 pgs., front/back cover and table of contents.
Twu, et al., "Preparation of Bulk and Supported Perovskites", Chapter 1, pp. 1-23 (1993), from Properties and Applications of Perovskite-type Oxides.
Smyth, "Oxidative Nonstoichiometry in Perovskite Oxides", Chapter 3, pp. 47-72, (1993), from Properties and Applications of Perovskite-type Oxides.
Notice of Allowance from U.S. Appl. No. 12/141,621 dated Oct. 7, 2014.

* cited by examiner

WELDING WIRE FOR SUBMERGED ARC WELDING

BACKGROUND

Gas Metal Arc Welding

Gas metal arc welding (GMAW), sometimes referred to by its subtypes metal inert gas (MIG) welding or metal active gas (MAG) welding, is a semi-automatic or automatic arc welding process in which a continuous and consumable wire electrode ("welding wire") and a shielding gas are fed through a welding gun.

Figure 1:
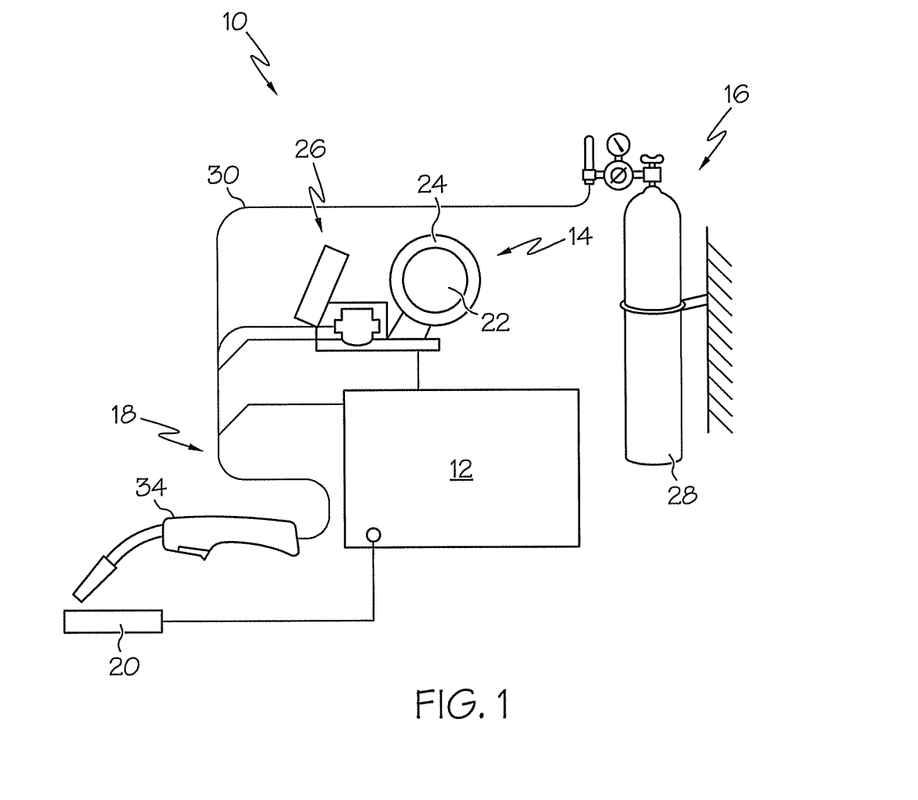
FIGS. 1 and 2 are schematic and perspective views illustrating a conventional GMAW welding system.
Figure 2:
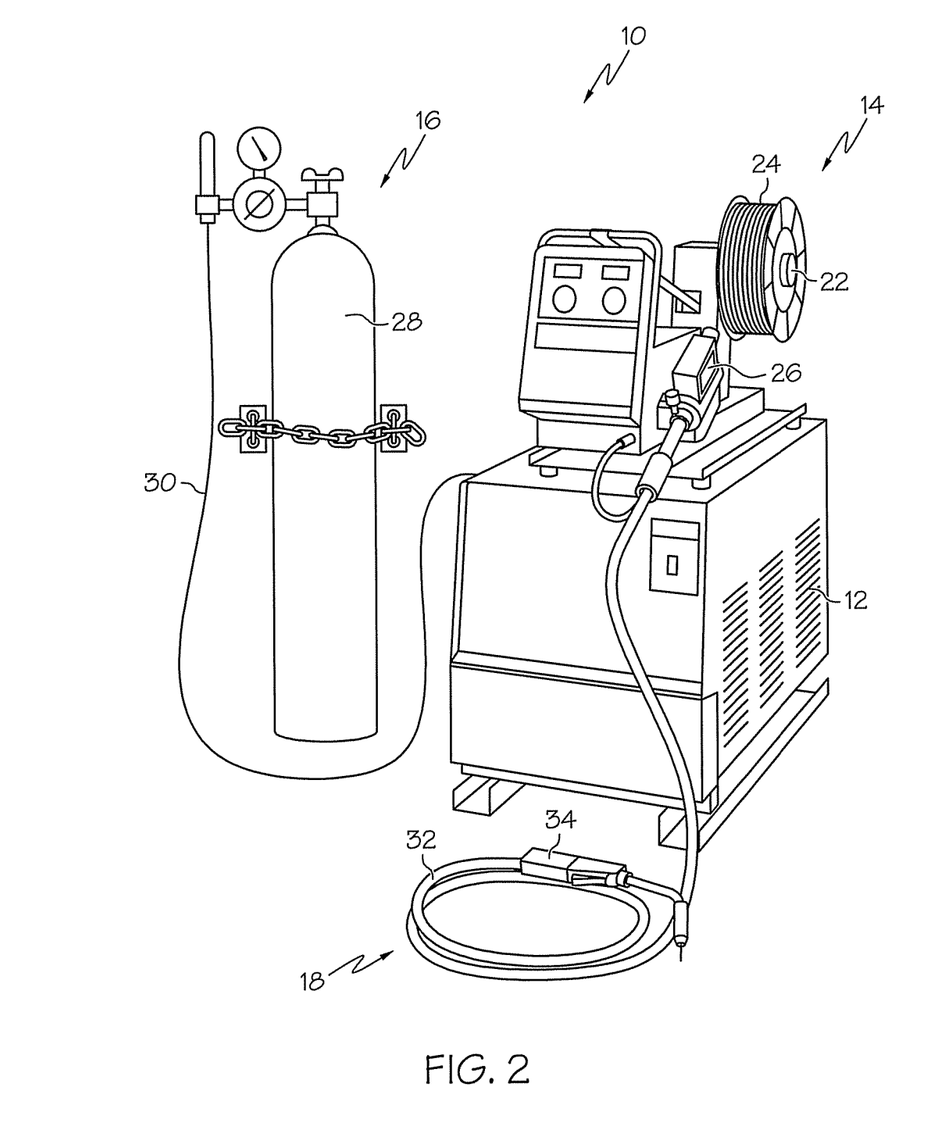

FIGS. 1 and 2 illustrate the basic design of a conventional industrial GMAW system. As shown in these figures, GMAW system 10 includes electrical power source 12, wire drive assembly 14, shielding gas supply system 16, and cable assembly 18 for carrying electrical power, welding wire and shielding gas to a workpiece 20 to be welded. Wire drive assembly 14 typically includes reel stand 22 for carrying a spool 24 of a continuous, consumable wire electrode as well as drive mechanism 26 including one or more drive wheels (not shown) for driving welding wire from spool 24 through cable assembly 18 to workpiece 20. Meanwhile, shielding gas supply system 16 normally includes shielding gas source 28 and gas supply conduit 30 in fluid communication with cable assembly 18.

Figure 3:
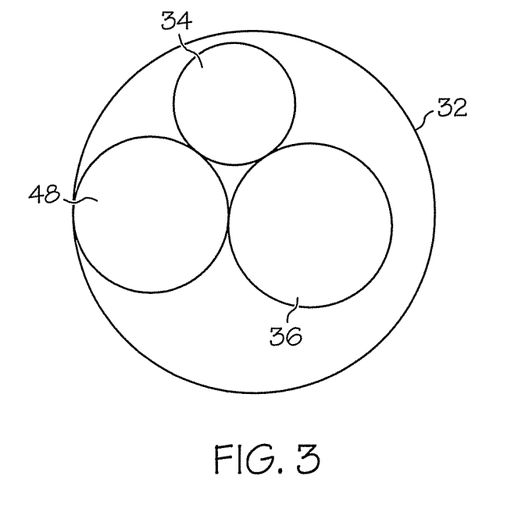
FIG. 3 is a schematic radial cross section of a typical elongated flexible cable used in the cable assembly of the GMAW system of FIGS. 1 and 2.

As illustrated especially in FIG. 2, cable assembly 18 typically takes the form of an elongated flexible cable 32 attached on one end to power source 12, wire drive assembly 14 and gas supply system 16 and on its other end to weld gun 34. As illustrated in FIG. 3, which is a radial cross-section of flexible cable 32, this flexible cable normally includes an electrical cable 34 for providing welding electrical power to the contact tip of weld gun 40, gas conduit 36 for transporting shielding gas, and flexible sheath 48 for housing the welding wire.

In practice, flexible cable 32 is normally at least 10 feet (~3 m) long, more typically at least 15 feet (~4.6 m), at least 20 feet (~6.1 m), at least 25 feet (~7.6 m), or even at least 30 feet (~9.1 m) long, so that electrical power source 12, wire drive assembly 14 and shielding gas supply system 16 can remain essentially stationary while weld gun 34 is moved by hand to various different locations. In addition, flexible cable 32 is normally made as flexible as possible, since this provides the greatest degree of flexibility in terms of moving and positioning weld gun 34 in any desired location. So, for example, flexible cable 32 is normally made flexible enough so that it can make relatively tight bends, such as being coiled into multiple revolutions, as illustrated in FIG. 2.

In order to prevent welding wire from snagging inside flexible cable 32, the welding wire is threaded through the interior of a flexible sheath 48. Normally, this flexible sheath is made from a metal wire tightly wound in a spiral whose inside diameter is only slightly larger than the outside diameter of the welding wire, since this structure provides a high degree of flexibility in flexible cable 32 while simultaneously preventing contact between the welding wire and other components inside the flexible cable.

Because of the length and flexibility of elongated flexible cable 32, it often takes a comparatively great amount of force to drive welding wire from spool 24 through cable assembly 18 onto workpiece 20. Therefore, it is common practice in industry to coat the welding wire with a solid lubricant such as graphite, molybdenum disulfide, etc. for reducing the coefficient of friction between its external surfaces and the internal surfaces the flexible sheath through which it passes.

Submerged Arc Welding

Figure 4:
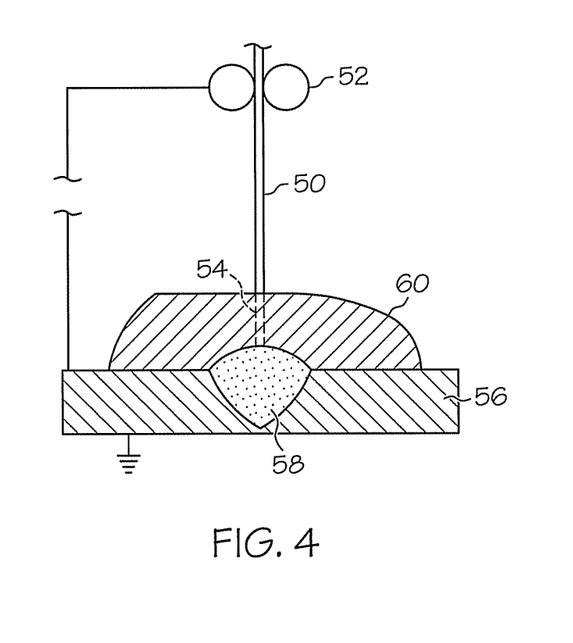
FIG. 4 is a schematic illustration of a conventional SAW welding system.

Submerged Arc Welding (SAW) differs from GMAW in that, in SAW, no external shielding gas is used. Instead, the molten weld and the arc zone are submerged under a blanket of a granular fusible flux which, when molten, provides a current path between the electrode and the workpiece being welded, and provides protection for the weldment from the surrounding atmosphere. See, FIG. 4, which schematically illustrates SAW, FIG. 4 showing a welding wire 50 driven by drive rollers 52 forming a weld 58 in a workpiece 56, the tip of the welding wire forming an arc 54 which is totally submerged in a layer of flux 60.

A particular advantage of SAW is that high deposition rates are possible. For example, depositions rates of over 100 pounds of applied weld metal per hour (45 kg/h) or more are possible with SAW, as compared with 5-10 pounds per hour (~2-4 kg/h) for GMAW. A particular disadvantage of SAW is that only horizontal surfaces can be welded, as a practical matter, since gravity will normally cause the granular flux to slide off of non-horizontal surfaces. Because of these constraints, SAW is normally used in applications where high deposition rate welds are made in large, horizontally-positioned objects, e.g., pipe manufacture.

Figure 5:
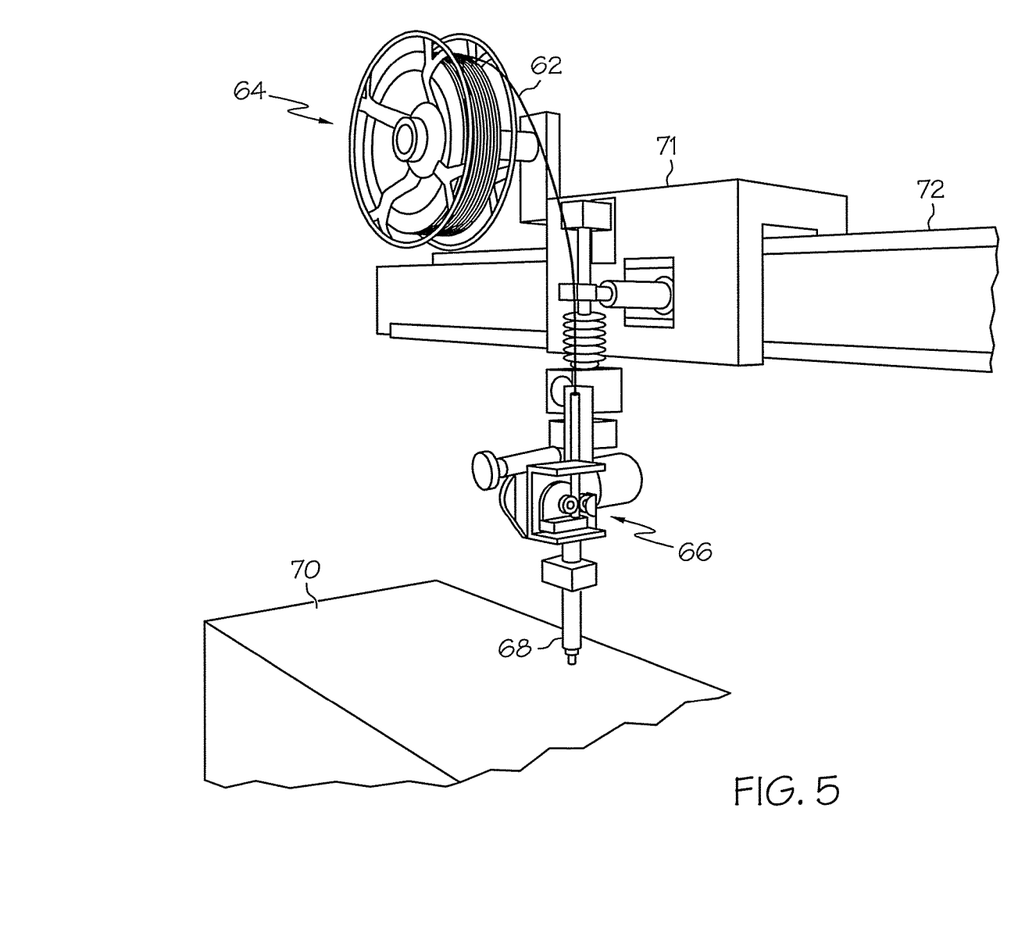
FIG. 5 is a perspective view illustrating one type of conventional SAW welding system.

FIG. 5 illustrates such a SAW system. In this system, welding wire 62 obtained from supply spool 64 is fed by means of supply assembly 66 including drive rollers (not shown) through weld gun 68 where it forms a weld on a workpiece (not shown) mounted in a stationary position on table 70. In the particular embodiment shown, supply spool 64, supply assembly 66 and weld gun 68 are mounted in fixed positions on frame 71, which is moveable along rail 72, so that a continuous weld can be formed along the entire length of the workpiece. In other embodiments, supply spool 64, supply assembly 66 and weld gun 68 are mounted in stationary positions, while the workpiece is moveable along table 70 to provide a continuos elongated weld. In either case, a suitable flux supply system (not shown) is normally provided for automatically covering the site to be welded with flux.

Depending on the application, this SAW system can be stationary, in the sense that the entire system is permanently mounted in a single use location. In other applications, this SAW system can be mobile, in the sense that the entire system can be moved between different use locations as, for example, in the welding of bridge girders.

Industrially, welding wire 62 is supplied to the weld gun 68 either on spools, as illustrated in FIG. 5, or in barrels, stems, or reels. In all cases, this wire supply is normally mounted in a fixed position with respect to, and usually fairly close to, weld gun 68. Similarly, supply assembly 66 is also usually mounted in a fixed position with respect to, and usually fairly close to, weld gun 68. As a result of these features, no guidance system such as flexible sheath 48 in the GMAW system illustrated in FIGS. 1-3 is necessary. This is because there is essentially no sliding friction between welding wire 62 and the structural elements transporting this welding wire from supply spool 64 to weld gun 68. Therefore, welding wire for SAW systems are not provided with the solid lubricants typically used in GMAW systems for reducing sliding friction.

As indicated above, deposition rates in SAW are typically much higher than in GMAW. This is made possible by using thicker welding wire and by using more electrical power than in GMAW. For example, welding wire for SAW is typically 1/16 inch (~1.6 mm) or more in diameter while welding wire for GMAW has a diameter of about 1/16 inch (~1.6 mm) or less. In any event, because of these substantially more intense conditions in SAW, the useful life of the contact tip of the welding gun through which the welding wire passes can be very short due to friction and abrasive wear. For example, the useful life of a standard, commercial beryllium copper contact tip when used for SAW welding with a clean (no drawing soap residue) bare (i.e., uclad) standard steel SAW welding wire can be as short as four hours or less.

Because of this problem, commercial SAW welding wire is almost always clad with a copper coating. Unfortunately, portions of this copper cladding are often stripped off the welding wire as it passes through the knruled drive rolls (e.g., drive rolls 52 in FIG. 4) and wire straighteners typically found in a standard SAW wire feeding system. Over time, this stripped copper can accumulate in the feeding system as copper flakes and may even contaminate the weld being formed. This copper contamination, in turn, can jeopardize weld integrity due a phenomenon known as "copper cracking," which is a type of liquid metal embrittlement.

SUMMARY OF THE INVENTION

In accordance with this invention, it has been found that conventional welding wire solid lubricants will work essentially as well as copper cladding in reducing contact tip abrasive wear in submerged arc welding. Thus it is possible, in accordance with this invention, to eliminate the copper waste and contamination problem normally encountered when using copper clad SAW welding wire in submerged arc welding while still maintaining the improved contact tip useful life that copper cladding enables.

Thus, the present invention provides a new welding wire for use in submerged arc welding comprising a submerged arc welding wire substrate and a particulate solid lubricant on the surfaces of the welding wire substrate.

In addition, the present invention also provides a process for reducing contact tip abrasive wear in submerged arc welding, the process comprising using as the welding wire a submerged arc welding wire substrate and a particulate solid lubricant on the surfaces of the welding wire substrate.

BRIEF DESCRIPTION OF THE DRAWINGS

The present invention may be more readily understood by reference to the following drawings in which.

DETAILED DESCRIPTION

In accordance with this invention, the copper cladding normally applied to the surfaces of a submerged arc welding wire for preventing weld gun contact tip abrasive wear is replaced with a solid lubricant.

SAW Welding Wire

This invention is applicable to any type of welding wire previously used, or that may be used in the future, in submerged arc welding. SAW wire will most commonly be a solid core metal wire, i.e., a solid metal wire. Such wires are most commonly made from carbon (mild) steel, although they can also be made from a variety of other metals and metal alloys such as stainless steels including austenitic, martensitic, ferritic and duplex stainless steels, low CTE alloys such as Invar and Kovar, and nickel-based superalloys such as Inconel, etc.

Normally, welding wire for SAW has a diameter of about 1/16 inch (~1.6 mm) or more while welding wire for GMAW has a diameter of about 1/16 inch (~1.6 mm) or less. SAW welding wire with diameters of 2 mm or more are more interesting, while SAW welding wire with diameters of 3 mm or more, or even 4 mm or more are especially interesting.

When this invention is used on flux-cored or metal-cored welding wires, any type of welding flux or metal can be included in the wire's core.

Similarly, although this invention will normally be used on bare (unclad) welding wire, it can also be use on clad welding wire bearing any type of metal coating, including copper. Copper cladding is preferably avoided.

Solid Lubricant

As previously indicated, solid welding wire lubricants are commonly used in GMAW welding systems to reduce the friction generated between a welding wire and the delivery system used for transferring the wire from a supply spool or other source to the workpiece being welded. In accordance with this invention, these same materials are used to replace the copper cladding normally applied to the surfaces of a submerged arc welding wire for preventing weld gun contact tip wear. All solid welding wire lubricants which have been previously used in GMAW, or which may be used in the future, for this purpose can be used as the solid lubricant of this invention. Solid lubricants which are based on, made from, or which otherwise liberate, metallic copper are preferably avoided.

Typical solid lubricants commonly used for wire lubrication in the welding industry include $MoS_2$, $WS_2$, ZnO (normally together with $WS_2$), graphite and/or PTFE (Teflon). Mixtures of these materials can also be used. Normally, these materials are used in particulate form. If so, any particle size which has previously been used, or which may be used in the future, for this purpose is useful in this invention. Particle sizes on the order of about 0.5-15 µm. or even about 1-µm, are more interesting. Particle sizes on the order of about 1-2 µm are especially interesting, particularly when the welding wire being coated had a fairly rough surface.

In addition to these materials, the patent literature indicates that many other solid materials are also useful as wire lubricants in the welding industry. For example, Japanese Kokai [published unexamined patent application] 2005-074438 indicates that sulfur based extreme pressure agents can be used for this purpose, while Kokai 2005-095972 indicates that various soaps such as sodium and potassium stearate can be used for this purpose. Meanwhile, Kokai 10-193175 indicates that the fume powder generated during iron and steel refining and which is composed primarily of iron oxide can be used for this purpose, while Kokai 2004-202572 indicates that copper powder can be used for this purpose. Similarly, Kokai 09-141489 indicates that inorganic potassium compounds such as potassium borate can be used for this purpose, while Kokai 08-157858 indicates that phosphorous acid esters can be used for this purpose. In addition, Kokai 2003-305587 indicates that iron, manganese and zinc phosphate films can be used for this purpose.

In addition to these disclosures, the patent literature also indicates that the above "common" solid lubricants, i.e., $MoS_2$, $WS_2$, ZnO (normally together with $WS_2$), graphite and/or PTFE (Teflon), can be combined with a wide variety of additional materials, especially particulate solids, for making effective welding wire lubricants. So, for example, Kokai 2006-095579 and Kokai 09-206987 indicate that calcium carbonate and boron nitride are analogues of molybdenum disulfide, at least when combined with a mineral such as mica, sericite or talc. Meanwhile, Kokai 09-323191 indicates that titanium dioxide, when combined with $MoS_2$ or $WS_2$, is an effective welding wire lubricant, while Kokai 08-057650 indicates that stainless steel powder, when combined with $WS_2$, is an effective welding wire lubricant. Similarly, Kokai 08-151548 indicates that potassium silicate can be used in combination with PTFE as an effective welding wire lubricant, while Kokai 06-285677 indicates that calcium and or sodium carbonate, fluoride or silicate of calcium or sodium, as well as silica acid glass, soda glass, potash glass and soda lime glass, when combined with PTFE or $MoS_2$, makes an effective welding wire lubricant. In the same way, Kokai 2006-095551 as well as many other Japanese Kokai indicate that phosphatide (a phospholipid) can be combined with $MoS_2$ for this purpose. These additional materials can also be used together with the "common" solid welding wire lubricants described above, in keeping with the above disclosures.

Commercially, solid welding wire lubricants can be used neat, i.e., without any additional ingredient. Normally, however, they are also combined with an organic binder to form a solid lubricant coating composition, since such organic binders may enhance lubricity and feedability. Examples of common organic binders include viscous oils such as vegetable oil, mineral oil, and various synthetic oils as well as various organic solids such as petroleum wax and the like. Liquid carriers such as water and/or various alcohols, e.g., isopropanol, can also be included for ease of application, especially when solid organic binders are used. As in the case of the solid lubricants, any organic binder and any liquid carrier, which have previously been used, or which may be used in the future, for promoting adhesion between such solid lubricants and the welding wire surfaces to which they adhere can be used in this invention. See the various domestic and foreign patent documents cited in this disclosure for an extensive disclosure of the different types of solid lubricants and binders typically used for making conventional feeding lubricants.

The amount of solid lubricant composition that can be used in particular applications of this invention varies widely, and essentially any amount can be used which provides an improvement in contact tip useful life. Generally speaking, the amount of solid lubricant composition used can be as much as 10 gms/m² of wire surface area to as little as 0.001 gms/m² of wire surface area, based on the weight of the solid lubricant itself, i.e., excluding the weight of any carrier, binder or other adjuvant that might be present. Solid lubricant loadings on the order of 0.01 to 1 gm/m², or even 0.05 to 0.5 gm/m² of wire surface area, based on the weight of the solid lubricant itself, are especially interesting.

Other Ingredients

Other active ingredients commonly included in welding wire lubricants can also be included in the solid wire lubricants of this invention. For example arc enhancers/stabilizers, which are typically sodium or potassium containing soaps or detergents, etc., can be used. See, for example, Kokai (Japanese Published Unexamined Application) 2004-034131, Kokai 08-257788, Kokai 2002-219595, Kokai 2002-239779, U.S. Pat. No. 6,337,144 and Kokai 2003-039191, the disclosures of which are incorporated herein by reference.

Solid Conductors

In accordance with another feature of this invention, a solid conductor can be included in the solid lubricant composition of this invention to reduce the electrical resistance between the SAW welding wire and the welding gun's contact tip.

In this connection, commonly assigned application Ser. No. 12/141,621, the disclosure of which is incorporated herein by reference, describes a technique for reducing the electrical resistance between a welding wire and the contact tip of the welding gun through which the wire passes by providing solid conductor on the welding wire's surfaces. The result, it is believed, will be that arc stability will be improved and the useful life of the contact tip will be increased. This same technology can be used in this invention by including a solid conductor in the solid lubricant coating compositions of this invention as well.

The solid conductors used in this aspect of the invention comprise a thermally stable, electrically conductive solid in fine particulate form. In this context, "electrically conductive" means that the solid conductor has an electrical conductivity, $\sigma$, of at least 10 S/cm (Siemens per centimeter) at 800° C., as determined by ASTM B193-02. In addition, "thermally stable" in this context means that the solid conductor remains solid (e.g., does not melt) and, in addition, is essentially unreactive in air at 1,200° C., as determined by TGA (Thermal Gravimetric Analysis) according to ASTM E2550-07. In this connection, note that graphite is not such a solid conductor, since it oxidizes at welding temperatures and hence is not "thermally stable." See, for example, Shimizu et al., Wear Mechanism in Contact Tube, *Science and Technology of Welding and Joining*, Vol. 11, No. 1, 2006, pp 94-105.

Solid conductors which are thermally stable at 1,350° C., 1,500° C., and even 1,600° C., are more interesting. Similarly, solid conductors with electrical conductivities at 800° C. of at least about 50 S/cm, at least about 75 S/cm and at least about 90 S/cm are more interesting. Solid conductors with electrical conductivities at 800° C. of at least about 200 S/cm, at least about 300 S/cm, at least about 400 S/cm, at least about 500 S/cm, and even at least about 1000 S/cm are contemplated.

By reducing electrical resistance between a welding wire and the contact tip through which it passes, according to this aspect of the invention, Joule heating of the contact tip is correspondingly reduced, it is believed. This should lead to a further significant decrease in contact tip wear due to excessive heating, and hence a further increase in contact tip useful life.

Any solid material which is thermally stable and electrically conductive, and which can also be provided in fine, particulate form, can be used as the solid conductor in this aspect of the invention. The particle size of the solid conductor is not critical, and essentially any particle size can be used. Generally speaking, the particle size of the solid conductor should be small enough so that it will adhere to the wire substrate surface with the particular binder selected and large enough so that the cost of obtaining the solid conductor does not become prohibitively expensive. In practical terms, this means that the average particle size of the solid conductor will normally be about 40 microns or less. Average particle sizes on the order of about 20 microns or less, about 10 microns or less, about 5 microns or less or even 2 microns or less are more interesting.

Moreover, while any thermally stable solid which has an electrical conductivity, $\sigma$, of at least about 10 S/cm (Siemens per centimeter) at 800° C. can be used as the solid conductor of this invention, those exhibiting electrical conductivities, $\sigma$, of at least about 25 S/cm at 800° C. are more interesting, while those exhibiting electrical conductivities, $\sigma$, of at least about 50 S/cm, at least about 75 S/cm, or even at least about 100 S/cm, at 800° C. are even more interesting. Thermally stable solids with even higher electrical conductivities, such as at least about 200 S/cm, at least about 300 S/cm, at least about 400 S/cm, at least about 500 S/cm, at least about 700 S/cm, or even at least about 1,000 S/cm, at 800° C. are contemplated.

One class of solid materials which can be used for this purpose are the electrically conductive perovskites. "Perovskite" refers to a general group of crystalline mixed metal oxides whose basic chemical formulas follows the pattern $ABO_3$. Common A-cations in perovskites are the rare earths, alkaline earths, alkalis and other large cations such as $Pb^{+2}$ and $Bi^{+3}$, with the following cations being more common: $Na^+$, $K^+$, $Rb^+$, $Ag^+$, $Ca^{+2}$, $Sr^{+2}$, $Ba^{+2}$, $Pb^{+2}$, $La^{+3}$, $Pr^{+3}$, $Nd^{+3}$, $Bi^{+3}$, $Ce^{+4}$ and $Th^{+4}$. Common B cations in perovskites include: $Li^+$, $Cu^{+2}$, $Mg^{+2}$, $Ti^{+3}$, $V^{+3}$, $Cr^{+3}$, $Mn^{+3}$, $Fe^{+3}$, $Co^{+3}$, $Ni^{+3}$, $Rh^{+3}$, $Ti^{+4}$, $Mn^{+4}$, $Ru^{+4}$, $Pt^{+4}$, $Nb^{+4}$, $Ta^{+5}$, $Mo^{+6}$ and $W^{+6}$.

Complex perovskite structures may contain two or more different A-cations, two or more different B-cations, or both. This normally results in ordered and disordered variants. Such complex perovskites crystal can also exhibit a stoichiometric excess or deficiency of oxygen atoms, especially when the crystal contains multiple A-cations (or B-cations) having different valence states from one another. Thus, complex perovskites can also be viewed as corresponding to the formula $A_{1-x}A'_xB_{1-y}B'_yO_z$, where z can vary above and below 3 so as to satisfy the valence states of the other elements present. Note, also, that sometimes complex perovskites are described with formulas such as $Y_1Ba_2Cu_3O_{7-\delta}$ in which the oxygen subscript varies around 6, rather than 3 as in the case of $ABO_3$. However, this is merely semantics, as $Y_1Ba_2Cu_3O_6$ is equivalent to $Y_{0.5}Ba_1Cu_{1.5}O_3$.

An especially interesting class of perovskites for this purpose is described as corresponding to the formula $ABO_x$, where A is at least one of La, Ce, Pr, Sm, Nd, Gd and Y; B is at least one of Ga, Mg, Mn, Fe, Cr, Co, Cu, Zn and Ni; and x is 2.5-3.2; wherein A may optionally be partially substituted with one or more of Sr, Ba and Ca. In this context, "partially substituted" means that up to 50 atom % of the A atoms can be replaced by the indicated substitutes, so long as the ratio of the total amount of A atoms plus substituents to the total amount of B atoms is preserved. Perovskites of this type in which A is substituted with at least 5 atom %, at least 10 atom %, or even at least 15 atom %, of the indicated substituents are interesting.

The amount of solid conductor on the surfaces of the wire substrate can vary widely, and essentially any amount can be used. In general, enough solid conductor should be used to provide a noticeable decrease in electrical resistance between the welding wire and the contact tip of the weld gun through which it passes during welding but not so much that handling of the welding wire becomes difficult. Thus, solid conductor loadings on the order of 0.001 to 10 gms/m² of wire surface area, or 0.01 to 1 gm/m², or even 0.05 to 0.5 gm/m² can be used.

The solid conductor of this aspect of the invention can be present in a weight ratio as low as 1:10 to as high as 10:1, based on the weight of the solid lubricant. Relative weight ratios of 5:1 to 1:5, 2:1 to 1:2, 1.5:1 to 1:1.5 and even about 1:1 are possible.

EXAMPLES

In order to more thoroughly describe this invention, the following working examples were conducted.

In each example, a 5/32 inch (~4 mm) diameter solid mild steel welding wire was welded in the flat (1F) position above a rotating mild steel pipe (30 inch diameter, 1.5 inch wall thickness). The pipe was rotated at approximately 0.8 rpm, resulting in a welding travel speed of approximately 75 inches per minute. Before welding, the surface of the pipe and the end of the contact tip were separated by a fixed 1.5 inch distance. During welding, the welding wire was fed at approximately 120 inches per minute, resulting in a welding current of approximately 1150 Amps. Welding voltage was held constant at 39 Volts. Lincolnweld 761 SAW flux was used for all welding trials.

All wires were welded for at least one hour. The contact tip wear associated with each wire was quantified by measuring the percent area increase of the contact tip bore through which the welding wire was fed. Pictures of contact tip bores were taken under a microscope (20× magnification); all pictures were calibrated for distance. Software (Able Image Analyzer v3.6) was used to measure the bore area of the contact tips based on the calibrated distances for each picture. The nominal bore diameter and area of a standard 5/32 inch SAW contact tip (before welding) was approximately 0.168 inches (4.26 mm) and 0.0221 in² (14.2 mm²), respectively. The composition of the particular contact tip used is as follows:

Composition (UNS-C17510):
  Beryllium→0.2-0.6%
  Nickel→1.40-2.30%
  Cobalt→0.30% Max
  Cobalt, Iron, & Nickel→2.6% Max
  Copper→Balance Except as otherwise indicated, each welding test lasted a total of 1 hour and was composed of two 30 minute continuous welding segments.

Two different 5/32 inch (~4 mm) diameter bare steel SAW wires were used in these tests, one having a rough surface and the other having a smooth surface. Five different tests were conducted. In two of the tests, Comparative Examples A and B, bare (uncoated) welding wires were used. In three of the tests, Examples 1-3, the welding wires were surface coated in accordance with this invention with a commercially available graphite feeding lubricant containing 1-2 μm graphite particles in alcohol. In a sixth test, Comparative Example C, a conventional copper clad SAW wire having a smooth surface was tested.

Moreover, to demonstrate the repeatability of these tests, Comparative Example A was repeated twice as Comparative Examples D and E on two different days. Finally, to show that the effect provided by the present invention is not due solely to the enhanced lubricity of the solid lubricant, Example 1 was repeated as Comparative Example F using a conventional liquid feeding lubricant (Mobil Velocite Oil No. 10 available from Exxon Mobile Corporation of Fairfax, Va., which is a non-aqueous product believed to be severely refined base oil containing stability-enhancing additives) instead of the solid lubricant of this example.

At the end of each test, contact tip wear was determined in the manner indicated above.

The following results were obtained:

TABLE 1

| | | Contact Tip Wear | | |
|---|---|---|---|---|
| Example | Surface | Solid Lubricant | Time, hr. | Wear, % |
| A | Rough | No | 1 | 29 |
| 1 | Rough | Yes | 1 | 7 |
| B | Smooth | No | 1 | 14 |
| 2 | Smooth | Yes | 1 | 10 |
| 3 | Rough | Yes | 4 | 11 |
| C | Smooth | (copper clad) | 4 | 3 |
| D | Rough | No | 1 | 28 |

TABLE 1-continued

Contact Tip Wear

| Example | Surface | Solid Lubricant | Time, hr. | Wear, % |
|---------|---------|-----------------|-----------|---------|
| E | Rough | No | 1 | 25 |
| F | Rough | No | 1 | 32 |

These results show that contact tip wear was significantly reduced in SAW by coating a bare SAW wire with a solid feeding lubricant in accordance with this invention. This, in turn, suggests that the useful life a copper based contact tip used in SAW can be substantially extended without using the copper cladding previously required for this purpose. In addition, these results further show that comparable results are not achieved when a conventional liquid feed lubricant is used in place of the solid lubricant of this invention.

Although only a few embodiments of this invention have been described above, it should be appreciated that many modifications can be made without departing from the spirit and scope of the invention. All such modifications are intended to be included within the scope of the present invention, which is to be limited only by the following claims:

The invention claimed is:

1. A submerged arc welding process for welding a workpiece in which an SAW welding wire is fed to the workpiece to be welded through the contact tip of a weld gun in such a way that the tip of the welding wire is submerged under a blanket of a granular fusible flux during welding, wherein the welding wire fed to the workpiece comprises a welding wire substrate and the residue obtained when a graphite feeding lubricant consisting essentially of graphite particles and a liquid comprising a viscous oil, an alcohol, water or mixtures thereof is applied to the surface of the welding wire, the amount of graphite feeding lubricant applied being sufficient to reduce the abrasive wear of the contact tip that is caused by the welding wire passing through the contact tip.

2. The process of claim 1, wherein the welding wire has a diameter of at least about 3 mm.

3. The process of claim 2, wherein the submerged arc welding wire substrate is free of copper cladding.

4. Welding wire for use in submerged arc welding in which the welding wire is fed to the workpiece to be welded through the contact tip of a contact gun, the welding wire comprising a submerged arc welding wire substrate and the residue obtained when a graphite feeding lubricant consisting essentially of graphite particles and a liquid comprising a viscous oil, an alcohol, water or mixtures thereof is applied to the surface of the welding wire and dried, the amount of graphite feeding lubricant applied being sufficient to reduce the abrasive wear of the contact tip that is caused by the welding wire passing through the contact tip, wherein the welding wire has a diameter of greater than ~3 mm.

5. The welding wire of claim 4, wherein the submerged arc welding wire substrate is free of copper cladding.

6. The process of claim 1, wherein the SAW welding wire is supplied to the weld gun from a wire supply mounted in fixed relationship with respect to the weld gun.

7. The process of claim 6, wherein the wire supply is at least one of a spool, barrel, stem or reel.

8. The process of claim 1, wherein the SAW welding wire is supplied to the weld gun from a wire supply without passing through a flexible sheath.

9. The process of claim 8, wherein the liquid comprises an alcohol.

10. The process of claim 8, wherein the liquid comprises water.

11. The process of claim 8, wherein the liquid comprises a viscous oil.

12. The process of claim 8, wherein the SAW welding wire is fed to the weld gun by a supply assembly including drive rollers, the supply assembly being mounted in fixed relationship with respect to the weld gun.

13. The process of claim 1, wherein the graphite particles have a particle size of about 0.5 to 15 µm.

14. The process of claim 13, wherein the graphite particles have a particle size of about 1 to 10 µM.

15. The process of claim 13, wherein the graphite particles have a particle size of about 1 to 2 µm.

16. The process of claim 1, wherein the liquid carrier comprises an alcohol.

17. The process of claim 1, wherein the liquid carrier comprises water.

18. The process of claim 1, wherein the liquid comprises a viscous oil.

19. The welding wire of claim 4, wherein the graphite particles having a particle size of about 0.5 to 15 µm.

20. The welding wire of claim 19, wherein the graphite particles having a particle size of about 1 to 10 µm.

21. The welding wire of claim 20, wherein the graphite particles having a particle size of about 1 to 2 µm.

22. The welding wire of claim 4, wherein the welding wire has a diameter of at least about 4 mm.

* * * * *